(12) United States Patent
Pudleiner et al.

(10) Patent No.: US 9,400,420 B2
(45) Date of Patent: Jul. 26, 2016

(54) REAR-PROJECTION FILM HAVING A "DAY/NIGHT" EFFECT

(71) Applicant: BAYER MATERIALSCIENCE AG, Leverkusen (DE)

(72) Inventors: Heinz Pudleiner, Krefeld (DE); Dirk Pophusen, Bergisch Gladbach (DE); Roland Kuenzel, Leverkusen (DE); Manfred Lindner, Pracht (DE); Juergen Wojatschek, Esslingen (DE); Bernd Straub, Starzach (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/655,510

(22) PCT Filed: Jan. 7, 2014

(86) PCT No.: PCT/EP2014/050142
§ 371 (c)(1),
(2) Date: Jun. 25, 2015

(87) PCT Pub. No.: WO2014/108395
PCT Pub. Date: Jul. 17, 2014

(65) Prior Publication Data
US 2015/0355536 A1    Dec. 10, 2015

(30) Foreign Application Priority Data

Jan. 8, 2013 (EP) .................................... 13150491
May 21, 2013 (EP) .................................... 13168476

(51) Int. Cl.
*G03B 21/62* (2014.01)
*G02B 5/02* (2006.01)
(Continued)

(52) U.S. Cl.
CPC .......... *G03B 21/62* (2013.01); *B29D 11/00788* (2013.01); *B29D 11/00865* (2013.01); *B32B 27/08* (2013.01); *B32B 27/20* (2013.01); *B32B 27/30* (2013.01); *B32B 27/302* (2013.01); *B32B 27/308* (2013.01); *B32B 27/32* (2013.01);
(Continued)

(58) Field of Classification Search
CPC ................................ G03B 21/60; G03B 21/62
See application file for complete search history.

(56) References Cited

U.S. PATENT DOCUMENTS

RE28,516 E  *  8/1975  Lu .......................... C08L 23/12
                                                            428/213
4,083,626 A  *  4/1978  Miyahara ............. G03B 21/625
                                                            359/453

(Continued)

FOREIGN PATENT DOCUMENTS

WO           9845753 A1     10/1998

OTHER PUBLICATIONS

International Search Report from corresponding PCT/EP2014/050142, mailed Feb. 4, 2014.

*Primary Examiner* — Christopher Mahoney
(74) *Attorney, Agent, or Firm* — McBee Moore Woodward Vanik, IP LLC

(57) ABSTRACT

The present invention relates to rear-projection film with "day/night" effect comprising at least two layers, where the film comprises at least one grey layer comprising at least one thermoplastic with transmittance of from 10% to 70% in the visible wavelength range and at least one layer comprising at least one thermoplastic and scattering particles, and also to the use of the said films as rear-projection areas in the vehicle interior sector.

18 Claims, 6 Drawing Sheets

(51) Int. Cl.
  *B29D 11/00* (2006.01)
  *B32B 27/20* (2006.01)
  *B32B 27/30* (2006.01)
  *B32B 27/32* (2006.01)
  *B32B 27/36* (2006.01)
  *B32B 27/40* (2006.01)
  *B32B 27/08* (2006.01)
  *B29K 69/00* (2006.01)

(52) U.S. Cl.
  CPC ............... *B32B27/365* (2013.01); *B32B 27/40* (2013.01); *G02B 5/0242* (2013.01); *G02B 5/0278* (2013.01); *G02B 5/0294* (2013.01); *B29K 2069/00* (2013.01); *B32B 2250/02* (2013.01); *B32B 2250/03* (2013.01); *B32B 2250/24* (2013.01); *B32B 2250/244* (2013.01); *B32B 2264/025* (2013.01); *B32B 2264/0214* (2013.01); *B32B 2307/402* (2013.01); *B32B 2307/4026* (2013.01); *B32B 2307/41* (2013.01); *B32B 2457/00* (2013.01); *Y10T 156/10* (2015.01)

(56) References Cited

U.S. PATENT DOCUMENTS

| | | | |
|---|---|---|---|
| 6,411,436 B1* | 6/2002 | Kikuchi | G03B 21/62 359/443 |
| 6,449,089 B1* | 9/2002 | Moshrefzadeh | G03B 21/604 359/454 |
| 7,417,794 B2* | 8/2008 | Browning | B32B 17/10036 359/452 |
| 8,284,487 B1 | 10/2012 | Liu | |
| 2006/0012754 A1* | 1/2006 | Larson | G03B 21/62 353/20 |
| 2011/0002036 A1 | 1/2011 | Perotti et al. | |
| 2012/0319999 A1* | 12/2012 | Kamiya | G02B 5/0231 345/175 |

* cited by examiner

US 9,400,420 B2

REAR-PROJECTION FILM HAVING A "DAY/NIGHT" EFFECT

CROSS REFERENCE TO RELATED APPLICATIONS

This application is a §371 National Stage Application of PCT/EP2014/050142, filed 7 Jan. 2014, which claims priority to EP 13150491.2, filed 8 Jan. 2013 and EP 13168476.3, filed 21 May 2013.

BACKGROUND

1. Field of the Invention

The present invention relates to rear-projection film with "day/night" effect comprising at least two layers, where the film comprises at least one grey layer comprising at least one thermoplastic with transmittance of from 10% to 70% in the visible wavelength range and at least one layer comprising at least one thermoplastic and scattering particles, and also to the use of the said films as rear-projection areas in the vehicle interior sector.

2. Description of Related Art

Rear-projection displays are considered to be an alternative to TFT/liquid-crystal displays and to be a technology of the future for vehicles. Diffuser films have been disclosed as projection films, but in particular for laser light sources do not give adequate brightness and especially exhibit undesired speckle characteristics.

Speckles are problematic bright spots of light which arise when coherent light is incident on a rough surface and is reflected. The same effect is also observed on transmission of laser light through rough, scattering surfaces or on transmission through materials which comprise scattering particles.

This phenomenon is caused by constructive and destructive interference of coherent light, by virtue of the different optical path lengths resulting from the scattering. The resultant statistical distribution of the interference effects, which appear as bright spots on a dark background, therefore alters not only with the properties of the light source but also with the scattering geometry, the position of the observer and the optical characteristics of the observer.

Known diffuser films provide opaque white or diffuse-matt white surfaces which do not suit the design of dashboards and centre consoles. Combination with "day/night" surfaces is an essential factor in harmonizing the claimed rear-projection films with the surfaces.

The prior art has disclosed Vikuiti™ rear-projection films as described in WO 1998/45753 A1, where glass beads have been applied on an acrylate film and the interstices/intermediate layer between beads and film has been filled with black dye. The beads focus the projected light and the black dye absorbs ambient light.

Disadvantages of the said films are the high manufacturing cost with use of the glass beads, the weight of these, and the fact that there are restrictions on the geometric spatial design of these films, since the precise arrangement of the glass beads permits only a certain curvature of the underlying film.

U.S. Pat. No. 8,284,487 B1 discloses a rear-projection screen composed of a plurality of projection tiles bonded to one another via adhesive and via a flexible film. The disadvantage of the said arrangement is the existence of seams and the restrictions in the spatial arrangement of the tiles.

SUMMARY

Starting from the prior art, it is an object to provide a film which by virtue of sufficiently high transmittance and resolution is suitable as rear-projection area for various light sources, in particular for LEDs and laser light, is flexible in terms of spatial arrangement, substantially suppresses speckle and is easy and inexpensive to manufacture.

Surprisingly, this object is achieved via the claimed plastics film comprising at least two layers, which comprises at least one grey layer made of at least one thermoplastic and having transmittance of from 10 to 70% in the visible wavelength range and at least one further layer comprising at least one thermoplastic and scattering particles.

One preferred embodiment of the invention is a plastics film with at least one grey layer made of a composition comprising about 90 to 99.99% by weight, preferably 95 to 99.95% by weight, particularly preferably 97.5 to 99.90% by weight, of a transparent plastic and about 0.01 to 10% by weight, preferably 0.05 to 5% by weight, particularly preferably 0.1 to 2.5% by weight, of at least one colour pigment.

The at least one further layer comprises a composition comprising about 85 to 99.99% by weight, preferably 87.5 to 99.99% by weight, particularly preferably 90 to 99.50% by weight, of a transparent plastic and about 0.01 to 15% by weight, preferably 0.1 to 12.5% by weight, particularly preferably 0.5 to 10% by weight, of at least one scattering particle.

The diffuser films produced from the claimed plastics compositions exhibit high light transmittance with little occurrence of speckle and can by way of example be used in illumination systems or infotainment systems. A factor of decisive importance here is little deflection of the light at the surface, with high light transmittance and focusing of the light in the direction towards the observer. The claimed plastics films exhibit adequately high transmittance for various light sources and for rear projection with laser light exhibit less occurrence of speckle than known plastics films. These plastics films having a further layer equipped with organic scattering particles are in particular suitable for rear projection using LED light sources, while the plastics films having a further layer comprising inorganic scattering particles, e.g. titanium dioxide, have particular suitability for rear projection using laser light sources.

It was surprising that, despite the omission of focusing glass beads with use of a coloured (i.e. grey) film the transmittance and the resolution provided by the plastics film are adequate for satisfactory rear projection, with advantageous reduction to suppression of speckle.

In another embodiment of the invention, the plastics film is characterized in that across more than 50% of the film area, preferably across more than 70% of the film area, the transmittance of the grey layer for light in the wavelength range from 450 to 600 nm differs by ±10% or less, preferably by ±7% or less, particularly preferably by ±5% or less. The transmittance of the grey layer is from 10 to 70%, preferably from 15 to 55%, particularly preferably from 20 to 50%.

Plastics that can be used for the plastics films are any of the transparent thermoplastics: polyacrylates, polymethacrylates (PMMA; Plexiglas® from Rohm), cycloolefin copolymers (COC; Topas® from Ticona; Zenoex® from Nippon Zeon or Apel® from Japan Synthetic Rubber), polysulphones (Ultrason® from BASF or Udel® from Solvay), polyesters, e.g. PET or PEN, polycarbonate, polycarbonate/polyester blends, e.g. PC/PET, polycarbonate/polycyclo-hexylmethanol cyclohexanedicarboxylate (PCCD; Sollx® from GE), polycarbonate/PBT (Xylex®).

DETAILED DESCRIPTION OF A PREFERRED EMBODIMENT

For the purposes of the invention it is preferable that the thermoplastic(s) in the layers mutually independently involve(s) polycarbonates or copolycarbonates based on diphenols, poly- or copolyacrylates, poly- or copolymethacrylates, poly- or copolymers with styrene, thermoplastic polyurethanes, polyolefins, poly- or copolycondensates of terephthalic acid or naphthalenedicarboxylic acid or a mixture of these, preferably polycarbonates or copolycarbonates based on diphenols, poly- or copolyacrylates, poly- or copolymethacrylates, poly- or copolycondensates of terephthalic acid or naphthalenedicarboxylic acid or a mixture of these.

It is preferable to use polycarbonates.

Suitable polycarbonates are any of the known polycarbonates, and these can be homopolycarbonates, copolycarbonates and thermoplastic polyester carbonates.

They preferably have average molecular weights $\overline{M}_w$ of from 18 000 to 40 000, preferably from 22 000 to 36 000 and in particular from 24 000 to 33 000, determined via measurement of relative solution viscosity in dichloromethane or in mixtures of equal quantities by weight of phenol/o-dichlorobenzene with calibration via light scattering.

For the production of polycarbonates reference may be made by way of example to "Schnell, Chemistry and Physics of Polycarbonates, Polymer Reviews, Vol. 9, Interscience Publishers, New York, London, Sydney 1964", and to "D. C. PREVORSEK, B. T. DEBONA and Y. KESTEN, Corporate Research Center, Allied Chemical Corporation, Moristown, N.J. 07960, 'Synthesis of Poly(ester)carbonate Copolymers' in Journal of Polymer Science, Polymer Chemistry Edition, Vol. 19, 75-90 (1980)", and to "D. Freitag, U. Grigo, P. R. Müller, N. Nouvertne, BAYER AG, 'Polycarbonates' in Encyclopedia of Polymer Science and Engineering, Vol. 11, Second Edition, 1988, pp. 648-718" and finally to "Dres. U. Grigo, K. Kircher and P. R. Müller 'Polycarbonate' in Becker/Braun, Kunststoff-Handbuch, Volume 3/1, Polycarbonate, Polyacetale, Polyester, Celluloseester [Polycarbonates, Polyacetals, Polyesters, Cellulose esters], Carl Hanser Verlag, Munich, Vienna, 1992, pp. 117-299".

Production of the polycarbonates preferably uses the interfacial process or the melt-transesterification process, and is described below by way of example by taking the interfacial process.

Compounds preferably to be used as starting compounds are bisphenols of the general formula

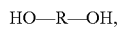

HO—R—OH, in which R is a divalent organic moiety having from 6 to 30 carbon atoms which comprises one or more aromatic groups.

Examples of compounds of this type are bisphenols which belong to the group of the dihydroxy-biphenyls, bis(hydroxyphenyl)alkanes, indanebisphenols, bis(hydroxyphenyl) ethers, bis(hydroxy-phenyl)sulphones, bis(hydroxyphenyl) ketones and α,α'-bis(hydroxyphenyl)diisopropylbenzenes.

Particularly preferred bisphenols which belong to the abovementioned groups of compounds are bisphenol A, tetraalkylbisphenol A, 4,4-(meta-phenylenediisopropyl)diphenol (bisphenol M), 4,4-(para-phenylenediisopropyl)diphenol, 1,1-bis(4-hydroxyphenyl)-3,3,5-trimethylcyclohexane (BPTMC) and, where appropriate, mixtures of these.

It is preferable that the bisphenol compounds to be used according to the invention are reacted with carbonic acid compounds, in particular phosgene, or in the case of the melt-transesterification process with diphenyl carbonate or dimethyl carbonate.

Polyester carbonates are preferably obtained via reaction of the abovementioned bisphenols, at least one aromatic dicarboxylic acid and, where appropriate, carbonic acid equivalents. Examples of suitable aromatic dicarboxylic acids are phthalic acid, terephthalic acid, isophthalic acid, 3,3'- or 4,4'-biphenyldicarboxylic acid and benzophenonedicarboxylic acids. A portion, up to 80 mol %, preferably from 20 to 50 mol %, of the carbonate groups in the polycarbonates can have been replaced by aromatic dicarboxylic ester groups.

Examples of inert organic solvents used in the interfacial process are dichloromethane, the various dichloroethanes and chloropropane compounds, tetrachloromethane, trichloromethane, chlorobenzene and chlorotoluene, and it is preferable to use chlorobenzene or dichloromethane or mixtures of dichloromethane and chlorobenzene.

The interfacial reaction can be accelerated by catalysts such as tertiary amines, in particular N-alkylpiperidines or onium salts. Preference is given to use of tributylamine, triethylamine and N-ethylpiperidine. In the case of the melt-transesterification process it is preferable to use the catalysts mentioned in DE-A 4 238 123.

Intentional and controlled branching of the polycarbonates can be achieved by using small quantities of branching agents. Some suitable branching agents are: phloroglucinol, 4,6-dimethyl-2,4,6-tri(4-hydroxyphenyl)hept-2-ene; 4,6-dimethyl-2,4,6-tri(4-hydroxyphenyl)heptane; 1,3,5-tri(4-hydroxyphenyl)benzene; 1,1,1-tri(4-hydroxyphenyl)ethane; tri(4-hydroxyphenyl)phenylmethane; 2,2-bis [4,4-bis(4-hydroxyphenyl)cyclohexyl]propane; 2,4-bis(4-hydroxyphenylisopropyl)phenol; 2,6-bis(2-hydroxy-5'-methylbenzyl)-4-methylphenol; 2-(4-hydroxyphenyl)-2-(2, 4-dihydroxy-phenyl)propane; hexa(4-(4-hydroxyphenylisopropyl)phenyl) orthoterephthalate; tetra(4-hydroxyphenyl)methane; tetra(4-(4-hydroxyphenylisopropyl)phenoxy)methane; α,α,'α"-tris(4-hydroxypheny-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxy-triphenyl)methyl)benzene and in particular: 1,1,1-tri(4-hydroxyphenyl)ethane and bis(3-methyl-4-hydroxypheny)-2-oxo-2,3-dihydroindole.

The branching agents or mixtures of branching agents to be used concomitantly where appropriate in amounts of from 0.05 to 2 mol %, based on diphenols used, can be used together with the diphenols but can also be added at a later stage of the synthesis.

Chain terminators used are preferably phenols such as phenol, alkylphenols such as cresol and 4-tert-butylphenol, chlorophenol, bromophenol, cumylphenol or a mixture of these, in quantities of from 1 to 20 mol %, preferably from 2 to 10 mol %, per mole of bisphenol. Preference is given to phenol, 4-tert-butylphenol and/or cumylphenol.

Chain terminators and branching agents can be added separately or else together with the bisphenol to the syntheses.

Production of the polycarbonates by the melt-transesterification process is described by way of example in DE-A 4 238 123.

Polycarbonates preferred according to the invention for the second layer of the claimed multilayer product are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Particular preference is given to the homopolycarbonate based on bisphenol A.

The polycarbonate can comprise stabilizers. Examples of suitable stabilizers are phosphines, phosphites or Si-comprising stabilizers and other compounds mentioned in EP-A 0 500 496. Examples that may be mentioned are triphenyl phosphites, diphenyl alkyl phosphites, phenyl dialkyl phosphites, tris(nonylphenyl) phosphite, tetrakis(2,4-di-tert-butylphenyl) 4,4'-biphenylene-diphosphonite and triaryl phosphite. Particular preference is given to triphenylphosphine and tris (2,4-di-tert-butylphenyl) phosphite.

The polycarbonate can moreover comprise from 0.01 to 0.5% by weight of the esters or partial esters of mono- to hexahydric alcohols, in particular of glycerol, of pentaerythritol or of Guerbet alcohols.

Examples of monohydric alcohols are stearyl alcohol, palmityl alcohol and Guerbet alcohols.

An example of a dihydric alcohol is glycol.

An example of a trihydric alcohol is glycerol.

Examples of tetrahydric alcohols are pentaerythritol and mesoerythritol.

Examples of pentahydric alcohols are arabitol, ribitol and xylitol.

Examples of hexahydric alcohols are mannitol, glucitol (sorbitol) and dulcitol.

The esters are preferably the monoesters, diesters, triesters, tetraesters, pentaesters and hexaesters or a mixture of these, in particular random mixtures, derived from saturated, aliphatic $C_{10}$ to $C_{36}$-monocarboxylic acids and, where appropriate, hydroxymonocarboxylic acids, preferably using saturated, aliphatic $C_{14}$ to $C_{32}$-monocarboxylic acids and, where appropriate, hydroxymonocarboxylic acids.

The commercially obtainable fatty acid esters, in particular of pentaerythritol and of glycerol, can by virtue of the production process comprise <60% of various partial esters.

Examples of saturated, aliphatic monocarboxylic acids having from 10 to 36 carbon atoms are capric acid, lauric acid, myristic acid, palmitic acid, stearic acid, hydroxystearic acid, arachic acid, behenic acid, lignoceric acid, cerotinic acid and montanic acids.

Preferred saturated, aliphatic monocarboxylic acids having from 14 to 22 carbon atoms are by way of example myristic acid, palmitic acid, stearic acid, hydroxystearic acid, arachic acid and behenic acid.

Particular preference is given to saturated, aliphatic monocarboxylic acids such as palmitic acid, stearic acid and hydroxystearic acid.

The saturated, aliphatic $C_{10}$ to $C_{36}$-carboxylic acids and the fatty acid esters are per se either known from the literature or amenable to production by processes known from the literature. Examples of pentaerythritol fatty acid esters are the esters of the particularly preferred, abovementioned monocarboxylic acids.

Particular preference is given to esters of pentaerythritol and of glycerol with stearic acid and palmitic acid.

Particular preference is also given to esters of Guerbet alcohols and of glycerol with stearic acid and palmitic acid and, where appropriate, hydroxystearic acid.

In another embodiment of the invention, the plastics film is characterized in that the scattering particles of the further layer can be organic and/or inorganic scattering particles.

Transparent organic scattering pigments used can in principle comprise any of the acrylates which have adequately high thermal stability extending to at least 300° C., so as to avoid decomposition at the processing temperatures of the transparent plastic, preferably polycarbonate. Pigments are moreover not permitted to have any functionalities which lead to any degradation of the polymer chain of the polycarbonate.

It is therefore possible by way of example to use Paraloid® products from Rohm & Haas or Techpolymer® products from Sekisui with very good results for the pigmentation of transparent plastics. A large number of different products is available from the said product range. It is preferable to use Techpolymer® products from Sekisui.

The polymeric particles are useful for providing light-scattering properties to the transparent plastics, preferably polycarbonate. The difference between the refractive index n of the polymeric particles or of the core and of the shell(s) of the polymeric particles and the refractive index of the transparent plastic, preferably of the polycarbonate, is preferably within +/−0.25 unit, more preferably within +/−0.18 unit, most preferably within +/−0.12 unit. The difference between the refractive index n of the polymeric particle and the refractive index of the transparent plastic, preferably of the polycarbonate, is preferably no less than +/−0.003 unit, more preferably no less than +/−0.01 unit, most preferably no less than +/−0.05 unit.

The refractive index is measured in accordance with the standard ASTM D542-50 and/or DIN 53 400.

The average particle diameter of the polymeric particles is generally at least 0.5 micrometer, preferably from at least 1 micrometer to at most 100 μm, more preferably from 2 to 50 micrometers, most preferably from 2 to 15 micrometers. The expression "average particle diameter" means the numeric average. The diameter of preferably at least 90%, most preferably at least 95%, of the polymeric particles is more than 2 micrometers. The polymeric particles are a free-flowing powder, preferably in compacted form.

The polymeric particles can be produced in a known manner. At least one monomer component is generally subjected to emulsion polymerization with formation of emulsion polymer particles. The emulsion polymer particles are swollen with the same or one or more other monomer components of the core polymer, and the monomer(s) are polymerized within the emulsion polymer particles. The stages of the swelling and polymerization can be repeated until the particles have grown to the desired core size. The core polymer particles are suspended in a second aqueous monomer emulsion, and an outer polymer layer made of the monomer(s) can optionally be polymerized onto the polymer particles in the second emulsion. One or more shells can be polymerized on the core polymer. The production of polymer particles with core/shell is described in EP-A 0 269 324 and in the U.S. Pat. Nos. 3,793,402 and 3,808,180.

For the purposes of the invention, inorganic scattering particles are titanium dioxide, silicon dioxide, aluminium oxide, aluminium hydroxide, aluminium potassium silicate (mica), aluminium silicate (kaolin), barium sulphate ($BaSO_4$), calcium carbonate, magnesium silicate (talc powder), zinc oxide, calcium sulphate, magnesium oxide, beryllium oxide, zirconium oxide, hollow or other glass beads or a mixture of these.

For the purposes of the invention, the size of the inorganic scattering particles is less than 1 μm, preferably from 0.05 to 0.9 μm, particularly preferably from 0.2 to 0.75 μm.

The claimed plastics films can be produced by extrusion, coextrusion, lamination or extrusion-lamination.

For the extrusion process, pelletized thermoplastic is introduced into the extruder and melted in the plastification system of the extruder. The plastics melt is forced through a slot die and thus subjected to a forming process, converted to the desired final form in the nip of a polishing calender and fixed in its shape by cooling on alternate sides on polishing rolls and by the ambient air. The high-melt-viscosity plastics used for the extrusion process are usually processed at melt temperatures of from 260 to 320° C., and the barrel-section temperatures of the plastification barrel section, and also the die temperatures, are set accordingly.

The rubber rolls used for the structuring of the film surface are disclosed in DE 32 28 002 (or in the US equivalent U.S. Pat. No. 4,368,240) of Nauta Roll Corporation.

By use of one or more ancillary extruders and suitable melt adapters upstream of the slot die it is possible to achieve mutual superposition of plastics melt, in particular polycarbonate melts, of different composition and thus to produce coextruded films (see by way of example EP-A 0 110 221 and EP-A 0 110 238).

In one preferred embodiment of the invention, the surface roughness ($R_3z$) of the plastics film is from 1 to 10 μm, preferably from 2 to 8 μm, particularly preferably from 3 to 7 μm on the outwards-facing surface of the further layer comprising at least one thermoplastic and scattering particles.

Additives, such as UV absorbers, and also other conventional processing aids, in particular mould-release agents and flow agents, and also the stabilizers conventionally used for plastics, in particular for polycarbonates, in particular heat stabilizers, and also antistatic agents or optical brighteners can be comprised not only by the grey layer but also by the further layer, and also by any optionally present coextruded layer(s) of the claimed plastics films, and by mouldings resulting therefrom. It is possible here that each layer comprises different additives or concentrations of additives.

In one preferred embodiment, the composition of the film also comprises from 0.01 to 0.5% by weight of an UV absorber from the following classes: benzotriazole derivatives, dimeric benzotriazole derivatives, triazine derivatives, dimeric triazine derivatives, diaryl cyanoacrylates.

In particular, it is possible that an—optionally further—coextruded layer comprises antistatic agents, UV absorbers and mould-release agents.

Examples of suitable stabilizers are phosphines, phosphites or Si-comprising stabilizers and other compounds mentioned in EP-A 0 500 496. Examples that may be mentioned are triphenyl phosphites, diphenyl alkyl phosphites, phenyl dialkyl phosphites, tris(nonylphenyl)phosphite, tetrakis(2,4-di-tert-butylphenyl) 4,4'-biphenylene-diphosphonite, bis(2,4-dicumylphenyl)pentaerythritoldiphosphite and triaryl phosphite. Particular preference is given to triphenylphosphine and tris(2,4-di-tert-butylphenyl)phosphite.

Examples of suitable mould-release agents are the esters or partial esters of mono- to hexahydric alcohols, in particular of glycerol, of pentaerythritol or of Guerbet alcohols.

Examples of monohydric alcohols are stearyl alcohol, palmityl alcohol and Guerbet alcohols, an example of a dihydric alcohol is glycol, an example of a trihydric alcohol is glycerol, examples of tetrahydric alcohols are pentaerythritol and mesoerythritol, examples of pentahydric alcohols are arabitol, ribitol and xylitol, and examples of hexahydric alcohols are mannitol, glucitol (sorbitol) and dulcitol.

The esters are preferably the monoesters, diesters, triesters, tetraesters, pentaesters and hexaesters or a mixture of these, in particular random mixtures, derived from saturated, aliphatic $C_{10}$ to $C_{36}$-monocarboxylic acids and, where appropriate, hydroxymonocarboxylic acids, preferably using saturated, aliphatic $C_{14}$ to $C_{32}$-monocarboxylic acids and, where appropriate, hydroxymonocarboxylic acids.

The commercially obtainable fatty acid esters, in particular of pentaerythritol and of glycerol, can by virtue of the production process comprise <60% of various partial esters.

Examples of saturated, aliphatic monocarboxylic acids having from 10 to 36 carbon atoms are capric acid, lauric acid, myristic acid, palmitic acid, stearic acid, hydroxystearic acid, arachic acid, behenic acid, lignoceric acid, cerotinic acid and montanic acids.

Examples of suitable antistatic agents are compounds having cationic activity, for example quaternary ammonium, phosphonium or sulphonium salts, compounds having anion activity, for example alkyl sulphonates, alkyl sulphates, alkyl phosphates, carboxylates in the form of alkali metal salts or of alkaline earth metal salts, non-ionic compounds, for example polyethylene glycol esters, polyethylene glycol ethers, fatty acid esters, ethoxylated fatty amines. Preferred antistatic agents are non-ionic compounds.

The thickness of the claimed plastics films can be from 0.1 to 10 mm, preferably from 0.2 to 5 mm, particularly preferably from 0.3 to 1 mm. The thickness of the grey layer here is from 0.05 to 9.25 mm, preferably from 0.1 to 0.4 mm, particularly preferably from 0.15 to 0.5 mm, while the thickness of the further layer is from 0.05 to 0.75 mm, preferably from 0.1 to 0.6 mm, particularly preferably from 0.15 to 0.5 mm.

In another embodiment of the invention, between the grey layer and the layer comprising the scattering particles, or behind this, there can be at least one further layer comprising at least one thermoplastic. The thickness of the said layer can be from 0 to 7.5 mm, preferably from 0 to 5 mm, particularly preferably from 0 to 3 mm.

For production of films by extrusion, the plastics pellets are introduced into the feed hopper of an extruder and passed through this into the plastification system, composed of screw and barrel.

Within the plastification system, the material is conveyed and melted. The plastics melt is forced through a slot die. Between plastification system and slot die the arrangement can have filter equipment, a melt pump, stationary mixing elements and other components. The melt emerging from the die passes onto a polishing calender. A rubber roll was used for the single-side structuring of the film surface. The final shaping takes place in the nip of the polishing calender. The rubber rolls used for the structuring of the film surface are disclosed in DE 32 28 002 (or in the US equivalent U.S. Pat. No. 4,368,240) of Nauta Roll Corporation. The shape is finally fixed by cooling and specifically on alternate sides on the polishing rolls and in the ambient air. The remaining equipment serves for transport, for the application of protective film, and for wind-up of the extruded films.

In one embodiment of the invention, the grey layer comprises at least one colour pigment or at least one dye, preferably at least one colour pigment from the Macrolex® range of Lanxess, Leverkusen, Germany, e.g. Macrolex Violet B GR, Macrolex Orange 3G, Macrolex Red 5B, Macrolex Green 5B, Macrolex Blue RR or a mixture of these. The grey layer here comprises about 0.01 to 10% by weight, preferably 0.05 to 5% by weight, particularly preferably 0.1 to 2.5% by weight, of at least one colour pigment.

It is preferable that the outwards-facing side of the grey layer has a further functional layer, preferably a scratch-resistant coating, an antireflective coating or an antiglare coating or a coating with one or more of these properties. The thickness of the said layer is preferably from 0.05 to 5 μm.

In another embodiment of the invention, the plastics film can comprise at least one further layer, for example a further coloured layer or a UV-protection layer.

The further coloured layer according to the invention can comprise organic dyes, inorganic colour pigments, fluorescent dyes and particularly preferably optical brighteners.

The UV-protection layer according to the invention is produced either by way of the production of a compounded material (a) made of (a1) a polyacrylate, composed of alkyl methacrylate, preferably having alkyl chain lengths below 10 carbon atoms ($-C_nH_{2n+1}$, where n<10), particularly preferably exclusively where n=1 (methyl methacrylate) and (a2) a biphenyl-substituted triazine. The compounded material (a) is then either (i) coextruded with polycarbonate in such a way that there is a thin UV-protection layer made of compounded material (a) with good adhesion on the polycarbonate surface or (ii) the compounded material (a) is further processed to give a thin film which is then used in an in-mould-coating or lamination process with polycarbonate to give a composite with good adhesion.

According to the invention, preference is given to those multilayer products selected from the group consisting of sheets, films and three-dimensional mouldings.

In one preferred embodiment of the invention, the plastics film has been subjected to a three-dimensional forming process and can thus provide a three-dimensional rear-projection area.

In another embodiment of the invention, the plastics film which contributes to speckle reduction is combined with other equipment or measures for speckle reduction, e.g. with matt panels or phase plates, statistically operated liquid-crystal cells, glass-fibre bundles with differing transit times, moving glass fibres, broadening of the linewidth of the laser or phase holograms in the beam path of the projector.

Likewise provided by the invention, accordingly, is the use of the plastics film as rear-projection film, preferably as rear-projection film in 'day/night' design, where use in back-lit components, preferably in back-lit display elements, control elements or decorative elements, is preferred. Use of the plastics films according to the invention is conceivable in the automobile, aircraft, rail-vehicle or watercraft interior sector or in electrical devices, preferably domestic electrical devices or devices in consumer electronics.

Further provided by the present invention is the use of the said plastics films, preferably with a further UV-protective layer, for outdoor applications with permanently high demands in relation to the visual impression, such as, for example, in glazing, preferably three-dimensional glazing.

The examples below provide further explanation of the invention, which is not restricted thereto. The examples according to the invention merely represent preferred embodiments of the present invention.

EXAMPLES

Makrolon 3108 550115
Colourless, high-viscosity bisphenol A polycarbonate with MVR 6.0 cm$^3$/10 min in accordance with ISO 1133 for 300° C. and 1.2 kg.
Makrolon 3100 000000
Natural-coloured, high-viscosity bisphenol A polycarbonate with MVR 6.0 cm$^3$/10 min in accordance with ISO 1133 for 300° C. and 1.2 kg.
Makrolon 2600 000000
Medium-viscosity bisphenol A polycarbonate with MVR 12.5 cm$^3$/10 min in accordance with ISO 1133 for 300° C. and 1.2 kg.
Tinopal OB
2,5-Thiophenediylbis(5-tert-butyl-1,3-benzoxazole) from Ciba
Kronos 2230 (titanium dioxide)
Polysiloxane-surface-treated titanium dioxide from Kronos Titan
Macrolex Violet B GR, Macrolex Orange 3G, Macrolex Red 5B, Macrolex Green 5B, Macrolex Blue RR
Colour pigments from Lanxess AG Example 1

Production of the White Compounded Material

The compounded material (pellets) comprising titanium dioxide was produced by using a conventional twin-screw compounding extruder at processing temperatures that are conventional for polycarbonates: from 275 to 300° C.

A compounded material with the following composition was produced:
- 97.419% by weight of Makrolon® 3100 000000 polycarbonate from Bayer MaterialScience AG
- 2.581% by weight of a powder mixture composed of
  - 1.51% by weight of Makrolon® 3100 000000 polycarbonate, ground, from Bayer MaterialScience AG
  - 0.02% by weight of Tinopal OB
  - 0.001% by weight of Macrolex Violet B GR
  - 1.05% by weight of Kronos 2230 (titanium dioxide)

2.58 kg of powder mixture composed of 1.51 kg of Makrolon® 3100 granules (obtained via grinding from the pellets) (average particle diameter about 0.8 mm, measured in accordance with ISO 13320-1 (laser diffraction method)) and 1.071 kg of mixture of Tinopal, Macrolex and titanium dioxide were metered into 97.42 kg of Makrolon® 3100 000000 in a twin-screw extruder (ZSK 32) at a rotation rate of 175 min$^{-1}$. The melt temperature was 306° C. and the resultant pellets were white and opaque.

Example 2

Production of a MBX-5 Scattering Masterbatch Via Compounding

The masterbatch is produced by using conventional twin-screw compounding extruders (e.g. ZSK 32) at processing temperatures that are conventional for polycarbonates: from 250 to 330° C.

A masterbatch with the following composition was produced:
- 80% by weight of Makrolon® 2600 000000 polycarbonate from Bayer MaterialScience AG
- 20% by weight of crosslinked spherical methyl methacrylate particles (Techpolymer® MBX-5 from Sekisui) with particle size from 2 to 10 μm and with average particle size about 5 μm.

Example 3

Production of a BMSA-18GN Scattering Masterbatch Via Compounding

The masterbatch is produced by using conventional twin-screw compounding extruders (e.g. ZSK 32) at processing temperatures that are conventional for polycarbonates: from 250 to 330° C.

A masterbatch with the following composition was produced:
- 80% by weight of Makrolon® 2600 000000 polycarbonate from Bayer MaterialScience AG
- 20% by weight of crosslinked spherical methyl methacrylate particles (Techpolymer® BMSA-18GN from Sekisui) with particle size from 0.5 to 5 μm and with average particle size about 2 μm.

Example 4

Production of a Grey Colour Masterbatch Via Compounding

The masterbatch is produced by using conventional twin-screw compounding extruders (e.g. ZSK 32) at processing temperatures that are conventional for polycarbonates: from 250 to 330° C.

A masterbatch with the following composition was produced:
  95.0% by weight of Makrolon® 3100 000000 polycarbonate from Bayer MaterialScience AG
  5% by weight of a powder mixture composed of
    4.374% by weight of Makrolon® 3100 000000 polycarbonate, ground, from Bayer MaterialScience AG
    0.226% by weight of Macrolex Orange 3G
    0.181% by weight of Macrolex Red 5B
    0.121% by weight of Macrolex Green 5B
    0.098% by weight of Macrolex Blue RR
5 kg of powder mixture composed of 4.374 kg of Makrolon® 3100 granules (obtained via grinding from the pellets) (average particle diameter about 0.8 mm, measured in accordance with ISO 13320-1 (laser diffraction method)) and 0.626 kg of mixture of the 4 Macrolex dyes were metered into 95 kg of Makrolon® 3100 000000 in a twin-screw extruder (ZSK 32) at a rotation rate of 175 $min^{-1}$. The melt temperature was 306° C. and the resultant pellets were black.

Production of the Coextruded Film:
Coextrusion of Films
The plant used was composed of
an extruder with a screw of diameter (D) 105 mm and of length 41×D. The screw comprises a devolatilization section;
a coextruder for the application of the outer layer with a screw of length 41 D and diameter 35 mm
a crosshead;
a specific coextrusion slot die of width 1500 mm;
a three-roll polishing calender with horizontal roll arrangement, where the third roll can be swivelled by +/−45° with respect to horizontal;
a roller-conveyor;
equipment for applying protective film on both sides;
take-off equipment;
wind-up unit.

The pellets of the parent material were introduced into the feed hopper of the main extruder. The respective material was melted and conveyed within the respective barrel/screw plastification system. The two melts were combined in the coextrusion die. The melt passes from the die onto the polishing calender, the rolls of which have the temperature specified in Table 1. The final shaping and cooling of the material takes place on the polishing calender. In order to smooth the surfaces and produce smooth film surfaces, polished chrome rolls were used. A rubber roll was used for the single-side structuring of the film surface. The rubber rolls used for the structuring of the film surface are disclosed in DE 32 28 002 (or in the US equivalent U.S. Pat. No. 4,368,240) of Nauta Roll Corporation. The film is then transported through a take-off, the protective film is applied on both sides, and the film is then wound up.

The following process parameters were selected:

TABLE 1

| | |
|---|---|
| Temperature of main extruder | 295° C. +/− 5° C. |
| Temperature of coextruder | 270° C. +/− 5° C. |
| Temperature of crosshead | 285° C. +/− 5° C. |
| Temperature of die | 300° C. +/− 5° C. |
| Rotation rate of main extruder | 60 $min^{-1}$ |
| Rotation rate of coextruder | 31 $min^{-1}$ |
| Temperature of roll 1 | 76° C. |
| Temperature of roll 2 | 73° C. |
| Temperature of roll 3 | 140° C. |
| Take-off velocity | 14.6 m/min |

Example 5

Main Extruder
A compounded material of the following composition was blended:
  7.4% by weight of grey masterbatch from Example 4 and
  92.6% by weight of Makrolon 3108 550115 polycarbonate from Bayer MaterialScience AG Coextruder:
A compounded material of the following composition was blended:
  50% by weight of scattering masterbatch from Example 2 and
  50% by weight of Makrolon 3108 550115 polycarbonate from Bayer MaterialScience AG A film was thus extruded with one smooth side on the coextruded layer and one structured side on the grey polycarbonate layer, and with a targeted total layer thickness of about 1000 μm. The thickness of the grey base layer was about 750 μm and the thickness of the coextruded scattering layer was about 250 μm. FIG. 3a depicts the resultant film, which was subjected to a forming process in a thermoforming trial as depicted in FIG. 3b.

Examples 6 to 12

Production of the Coextruded Film
Coextrusion of Films
The plant used for the production of the coextruded film(s) comprises:
  an extruder for the extrusion of the layer comprising at least one polycarbonate with a screw of diameter (D) 60 mm and of length 33 D. The screw comprises a devolatilization section;
  a coextruder for the application of the outer layer with a screw of length 25 D and diameter 35 mm;
  a crosshead;
  a slot die of width 450 mm;
  a three-roll polishing calender with horizontal roll arrangement, where the third roll can be swivelled by +/−45° with respect to horizontal;
  a roller-conveyor;
  thickness-measurement system;
  equipment for applying protective film on both sides;
  take-off equipment;
  wind-up unit.

The pellets were conveyed from the dryer into the feed hopper of the extruder. The material was melted and conveyed in the barrel/screw plastification system of the extruder. The melt passed from the slot die onto the polishing calender. The final shaping and cooling of the film took place on the polishing calender (composed of three rolls). For embossing of the surfaces, a polished chrome roll (high-gloss $1^{st}$ side) and a structured silicone rubber roll ($2^{nd}$ side) were used. The rubber rolls used for the structuring of the film surface are disclosed in U.S. Pat. No. 4,368,240 of Nauta Roll Corporation. The film was then transported through a take-off and was then wound up.

TABLE 2

| | White scattering-layer side $1^{st}$ side | Grey "day/night" side $2^{nd}$ side |
|---|---|---|
| Example 6 | 150 μm 100% of white compounded material from Example 1 | 750 μm 7.4% of MB from Example 4 + 92.6% of M 3108 550115 |

TABLE 2-continued

|  | White scattering-layer side 1st side | Grey "day/night" side 2nd side |
|---|---|---|
| Example 7 | 150 μm 75% of white compounded material from Example 1 + 25% of M 3108 550115 | 750 μm 7.4% of MB from Example 4 + 92.6% of M 3108 550115 |
| Example 8 | 150 μm 50% of white compounded material from Example 1 + 50% of M 3108 550115 | 750 μm 7.4% of MB from Example 4 + 92.6% of M 3108 550115 |
| Example 9 | 150 μm 25% of white compounded material from Example 1 + 75% of M 3108 550115 | 750 μm 7.4% of MB from Example 4 + 92.6% of M 3108 550115 |
| Example 10 | 112 μm 100% of white compounded material from Example 1 | 788 μm 7.4% of MB from Example 4 + 92.6% of M 3108 550115 |
| Example 11 | 75 μm 100% of white compounded material from Example 1 | 825 μm 7.4% of MB from Example 4 + 92.6% of M 3108 550115 |
| Example 12 | 37.5 μm 100% of white compounded material from Example 1 | 862.5 μm 7.4% of MB from Example 4 + 92.6% of M 3108 550115 |

The pellets were mixed in accordance with the "Grey "day/night" side" column in Table 2 and conveyed into the main extruder. The pellet mixture with the composition corresponding to the "White scattering-layer side" column in Table 2 was conveyed into the coextruder.

Coextruded films were produced with a white-coloured scattering layer (functional layer and incident side) and with a grey-coloured outer layer with "day/night" effect.

Production of the Single-Ply Extruded Film:
Extrusion of Films

The plant used for the production of the extruded single-ply film(s) comprises:
- an extruder for the extrusion of the layer comprising at least one polycarbonate with a screw of diameter (D) 60 mm and of length 33 D. The screw comprises a devolatilization section;
- a melt pump
- a crosshead;
- a slot die of width 450 mm;
- a three-roll polishing calender with horizontal roll arrangement, where the third roll can be swivelled by +/−45° with respect to horizontal;
- a roller-conveyor;
- thickness-measurement system;
- equipment for applying protective film on both sides;
- take-off equipment;
- wind-up unit.

The pellets were conveyed from the dryer into the feed hopper of the extruder. The material was melted and conveyed in the barrel/screw plastification system of the extruder. The melt passed from the slot die onto the polishing calender. The final shaping and cooling of the film took place on the polishing calender (composed of three rolls). For embossing of the surfaces, a polished chrome roll (high-gloss 1st side) and a structured silicone rubber roll (2nd side) were used. The rubber rolls used for the structuring of the film surface are disclosed in U.S. Pat. No. 4,368,240 of Nauta Roll Corporation. The film was then transported through a take-off and was then wound up.

Example 13

Not According to the Invention

The following composition was introduced into the main extruder for the production of the grey-coloured film with "day/night" effect:

1. 89.0% by weight of Makrolon® 3108 550115 (PC from Bayer MaterialScience AG)
2. 11.0% by weight of masterbatch as described in Example 1

A grey-coloured extruded film was thus obtained with a structured surface and with a total thickness of 250 μm and with light transmittance of 25%.

Example 14

Not According to the Invention

The following light-scattering composition was introduced into the main extruder:

3. 50.0% by weight of Makrolon® 3108 550115 (PC from Bayer MaterialScience AG)
4. 50.0% by weight of masterbatch as described in Example 2.

An extruded film was thus obtained with a structured surface and with a total thickness of 500 μm.

Example 15

Not According to the Invention

The following light-scattering composition was introduced into the main extruder:

5. 50.0% by weight of Makrolon® 3108 550115 (PC from Bayer MaterialScience AG)
6. 50.0% by weight of masterbatch as described in Example 3.

An extruded film was thus obtained with a structured surface and with a total thickness of 500 μm.

Example 16

Not According to the Invention

The following light-scattering composition was introduced into the main extruder:

7. 70.0% by weight of Makrolon® 3108 550115 (PC from Bayer MaterialScience AG)
8. 30.0% by weight of masterbatch as described in Example 2

An extruded film was thus obtained with a structured surface and with a total thickness of 500 p.m.

Example 17

One ply of film from Example 13 and one ply of film from Example 14 were used to form a stack in the abovementioned sequence, and the lamination was carried out in a lamination press from Bürkle with the following parameters:
- preheating: press to 185° C.
- pressing: 12 minutes at a pressure of 5 bar
- post-pressure phase: pressing for 8 minutes at a pressure of 125 bar
- cooling: pressing at 125 bar until the press opens after cooling to 45-50° C.

This gave a two-layer laminate with two smooth sides; the two film plies here had been welded seamlessly to one another and could no longer be separated from one another.

Example 18

One ply of film from Example 13 and one ply of film from Example 15 were used to form a stack in the abovementioned sequence, and the lamination was carried out in a lamination press from Bürkle with the following parameters:
preheating: press to 185° C.
pressing: 12 minutes at a pressure of 5 bar
post-pressure phase: pressing for 8 minutes at a pressure of 125 bar
cooling: pressing at 125 bar until the press opens after cooling to 45-50° C.

This gave a two-layer laminate with two smooth sides; the two film plies here had been welded seamlessly to one another and could no longer be separated from one another.

Example 19

One ply of film from Example 13 and one ply of film from Example 16 were used to form a stack in the abovementioned sequence, and the lamination was carried out in a lamination press from Bürkle with the following parameters:
preheating: press to 185° C.
pressing: 12 minutes at a pressure of 5 bar
post-pressure phase: pressing for 8 minutes at a pressure of 125 bar
cooling: pressing at 125 bar until the press opens after cooling to 45-50° C.

This gave a two-layer laminate with two smooth sides; the two film plies here had been welded seamlessly to one another and could no longer be separated from one another.

All of the claimed films from Examples 5 to 12 and 16 to 18 were then tested for suitability as rear-projection areas.

FIG. 3 shows claimed film from Example 5 in the thermoforming trial.

MEASUREMENT METHODS

Figure 1:
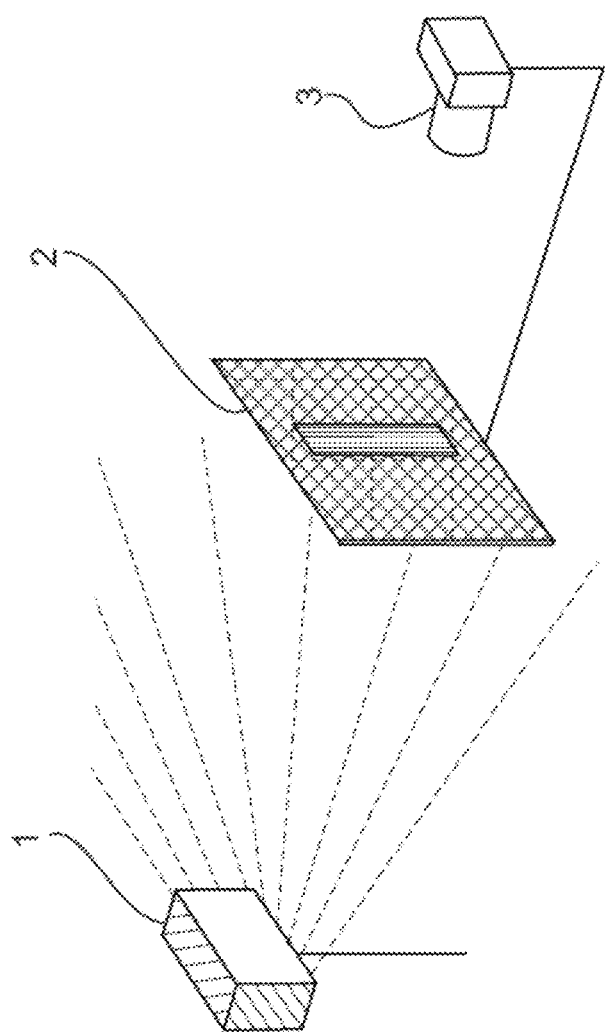
FIG. 1 shows the experimental set-up for the measuring of the modulation transfer function (MTF).

1. MTF Test:

FIG. 1 depicts the set-up for the modulation transfer function (MTF) test. The projection film to be tested was clamped into direct contact with an MTF test pattern (2) (Edmund Optics). The location of the MTF pattern here was on the side facing away from the camera. The reverse side of the projection film (pale-coloured side) was illuminated with parallel (collimated) light. A high-resolution luminance camera (3) (Canon EOS 350D) with macro lens was placed on the frontal side of the projection film and focused on the plane of the film. The divergence of the illumination was minimized by way of the distance from the illumination source, in this case a halogen source (1) and by way of suitable aperture arrangements.

A metrological method under dark-room conditions was used to record the sinusoidal intensity modulations due to the combination of MTF pattern and projection film (2), by way of the luminance camera (3) for the respective spatial frequency, i.e. maximal luminance $L_{max}$ and minimal luminance $L_{min}$ of the pixels were determined so as to provide the light and, respectively, dark value, and from these the contrast $c_{MTF}$ $$c_{MTF} = \frac{L_{max} - L_{min}}{L_{max} + L_{min}}$$

was calculated, taking into account the reference contrast values for the MTF pattern.

2. Speckle Test

Figure 2:
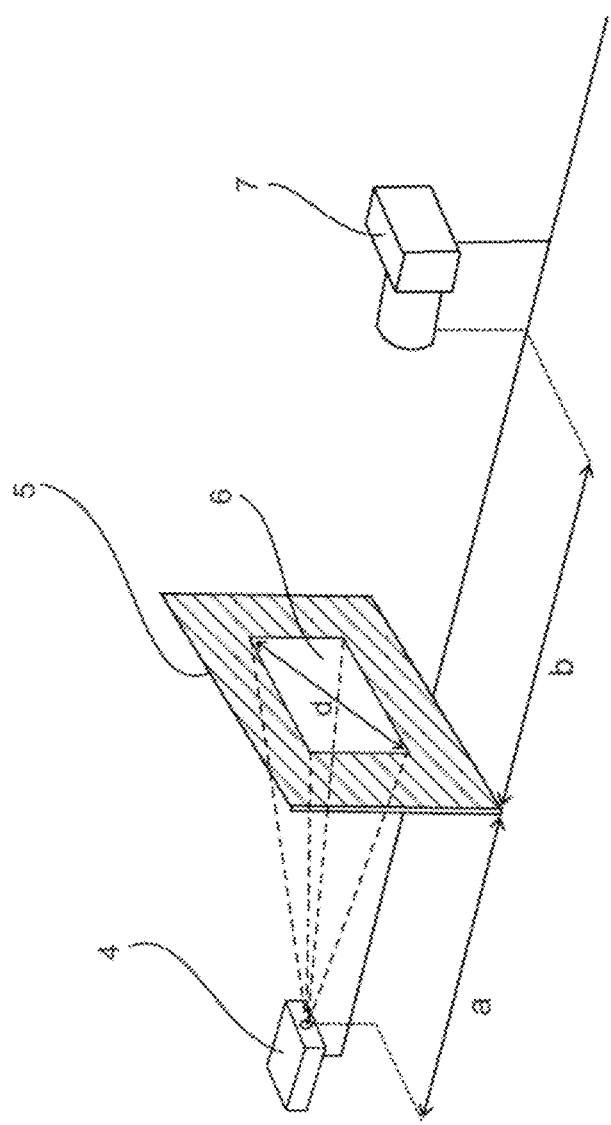
FIG. 2 shows the experimental set-up for the speckle test, composed of laser projector (4), rear-projection area (5 and 6) (at a distance a=25 cm) and luminance camera (7) (at a distance b=60 cm).

FIG. 2 depicts the experimental set-up for the speckle test. The rear-projection film (5) was illuminated at a distance a=25 cm by a Microvision ShowWX laser projector (4) (resolution 848×480 px, colour mode "brilliant") Located on the frontal side of the projection film (dark side) there was a high-resolution luminance camera (7) (Canon EOS 350D) at a distance b=60 cm. The camera parameters were adapted to be appropriate to the subjective perception of speckle by the human eye, and the lens was focused onto the projection area. Three single-colour, full-area test images (6) for the respective primary colours of the laser source (red, green and blue) were displayed by way of the laser projector and a metrological method under dark-room conditions was used to record these by means of the luminance camera (7). The speckle contrast $C_S$ for the respective colour is calculated by dividing the standard deviation $\sigma_I$ of the intensity I by its average value I.

$$C_S = \frac{\sigma_I}{\bar{I}} = \frac{\sqrt{\langle I^2 \rangle - \langle I \rangle^2}}{\langle I \rangle}$$

For projection films with high transmittance, in the absence of Fresnel optics, the light source produces a brightness profile in the image measured by the luminance camera. Additional high pass filtration was required here in order to avoid errors in calculation of the speckle contrast. The targeted speckle contrast for the experimental set-up selected was about 5%, in order to avoid any perception by the observer. The test results depend on the specific experimental set-ups and on the standard person observing these experimental images. The appropriate claimed film can be selected in accordance with requirements.

Transmittance Measurement:

Transmittance was measured by using a measurement system from Instrument Systems, composed of halogen light source (LS100-130), Ulbricht sphere (ISP 150L) and spectrometer (Spectro 320).

Thermoforming Study:

Microscopic studies of the cross sections of thermoformed specimens can be used to determine the flow behaviour of the laminates. The optical valuation was based on evaluation of the following: thickness changes, alterations of thickness relationships and transparency changes in the specimens.

Figure 3A:
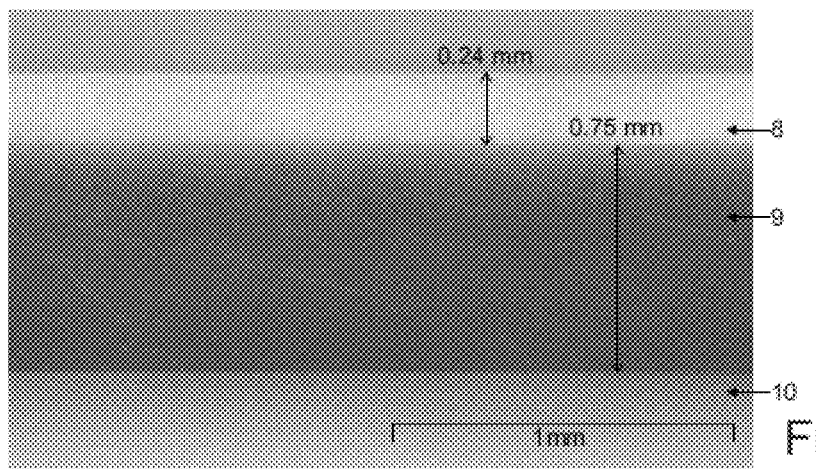
FIG. 3a depicts the cross section of the film before the thermoforming trial and FIG. 3b depicts the cross section of the film after the thermoforming trial.
Figure 3B:
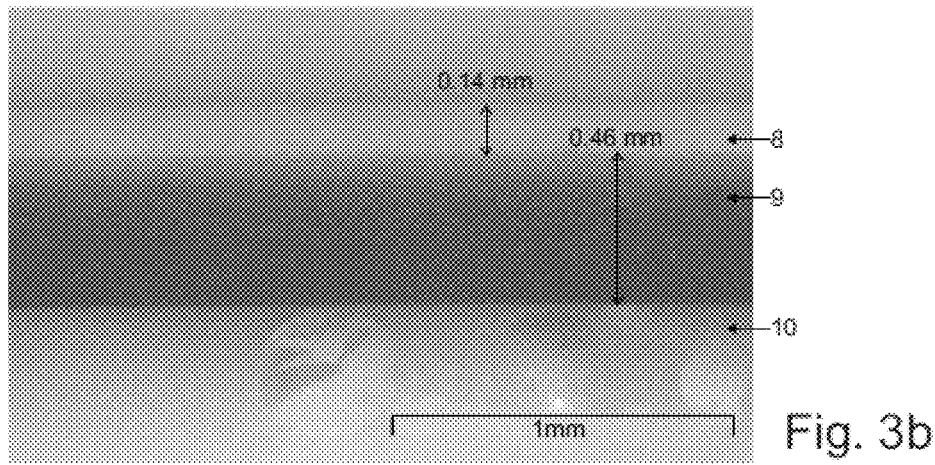

Results:

FIG. 3 shows the claimed film from Example 5 in the thermoforming trial: FIG. 3a depicts the cross section of the film prior to the thermoforming trial and FIG. 3b depicts the cross section of the film after the thermoforming trial. The thermoforming trial used a method known in principle to the person skilled in the art as described by way of example in "Thermoformen in der Praxis" [Practical Thermoforming] by Peter Schwarzmann, Ed.: ILL1G, $2^{nd}$ Edn., Carl Hanser Verlag, Munich, 2008. As seen in FIGS. 3a and b, the thickness of the grey film decreases from about 750 µm to 460 µm (reduction to 61%), whereas the thickness of the white film decreases from 240 µm to 150 µm (reduction to 62%). Within the limits of accuracy of measurement, both film layers therefore exhibit identical processing behaviour in the thermoforming process, i.e. the forming process modifies the optical properties of the film in a uniform and calculable manner.

Figure 4:
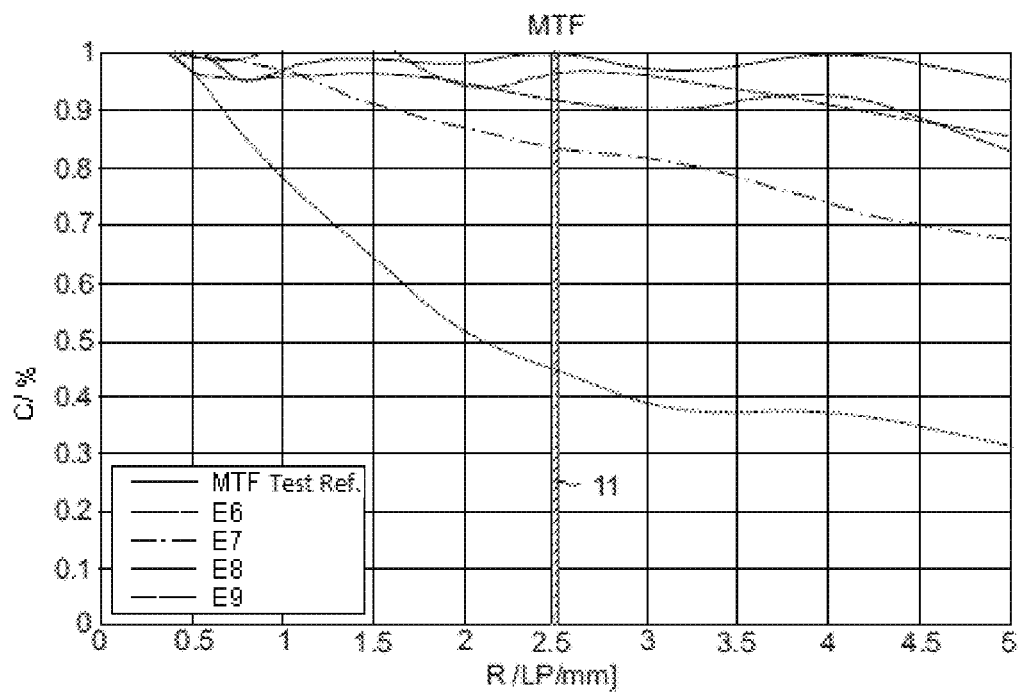
FIG. 4 shows the results of modulation transfer function measurement (MTF test) for Examples 6 to 9.

FIG. 4 exhibits the results of the modulation transfer function test (MTF test) for Examples 6 to 9. In comparison with Examples 7 to 9, Example 6, with white-layer thickness 150 µm and with 100% white-particle content exhibits the greatest decrease in contrast with increasing spatial frequency. At a spatial frequency of 2.5 line pairs/mm, corresponding to a line width of 200 µm, Example 6 shows a contrast of less than 0.5, whereas Examples 7, 8 and 9 with 75%, 50% and 25% of the white-particle content respectively exhibit markedly higher contrasts of more than 0.8, and indeed more than 0.9 in the case of Examples 8 and 9. One of the claimed films can be selected in accordance with requirements placed upon the projection area to be formed, and in accordance with the light source and the required contrast.

Figure 5:
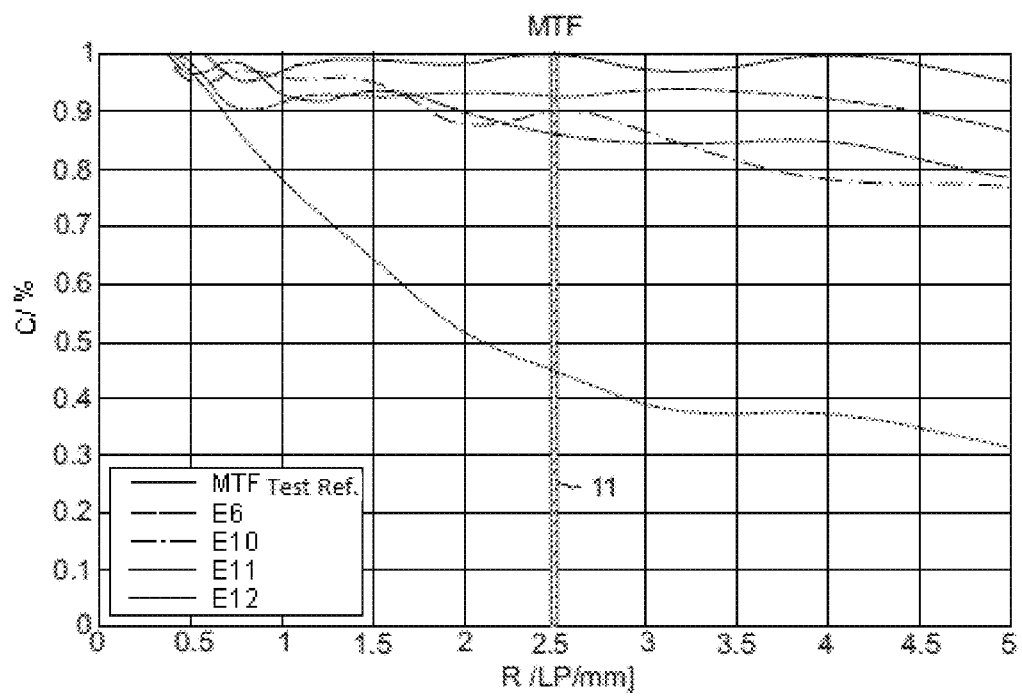
FIG. 5 shows the results of modulation transfer function measurement (MTF test) for Examples 6 and 10 to 12.

FIG. 5 shows the results of the modulation transfer function test (MTF test) for Examples 6 and 10 to 12. Here again, in comparison with Examples 10 to 12, Example 6, with white-layer thickness 150 µm and with 100% white-particle content exhibits the greatest decrease in contrast with increasing spatial frequency. At a spatial frequency of 2.5 line pairs/mm, corresponding to a line width of 200 µm, Example 6 shows a contrast of less than 0.5, whereas Examples 10, 11 and 12 with 75%, 50% and 25% of the white particle content respectively exhibit markedly higher contrasts of more than 0.85. Here again, one of the claimed films can be selected in accordance with the light source and the required contrast.

Figure 6A:
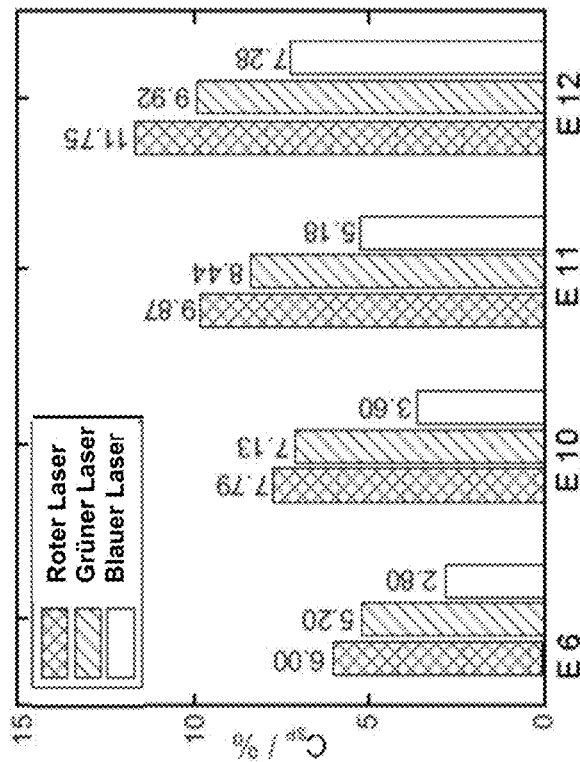
FIG. 6 shows the results of the speckle tests from the experimental set-up in FIG. 2 for Examples 6 to 12.

FIG. 6a) shows the results of the speckle tests measured by using the experimental set-up in FIG. 2 for Examples 6 to 12. In comparison with Examples 7 to 9, Example 6, with white-layer thickness of 150 µm and with 100% white-particle content exhibits the smallest speckle contrast for the respective laser light wavelength, where the speckle contrast values also decrease from red through green to blue as wavelength decreases. Examples 7, 8 and 9, with 75%, 50% and 25% of the white-particle content, respectively exhibit increasingly higher contrast values and therefore more pronounced speckle.

Figure 6B:
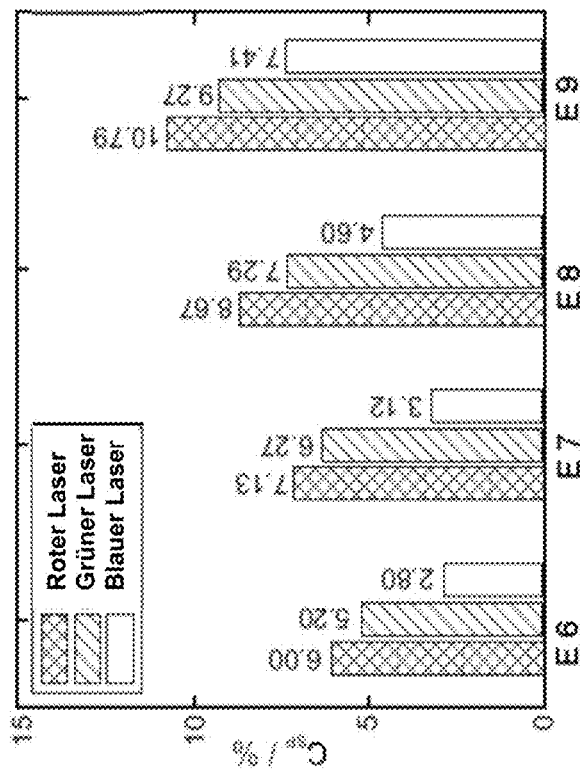

FIG. 6b) shows the results of the speckle tests measured by using the experimental set-up in FIG. 2 for Examples 6 and 10 to 12. Here again, in comparison with Examples 10 to 12, Example 6, with white-layer thickness of 150 µm and with 100% white-particle content exhibits the smallest speckle contrast for the respective laser light wavelength. Examples 10, 11 and 12, with 75%, 50% and 25% of the white-particle content, respectively exhibit increasingly higher contrast values and therefore more pronounced speckle.

Figure 7:
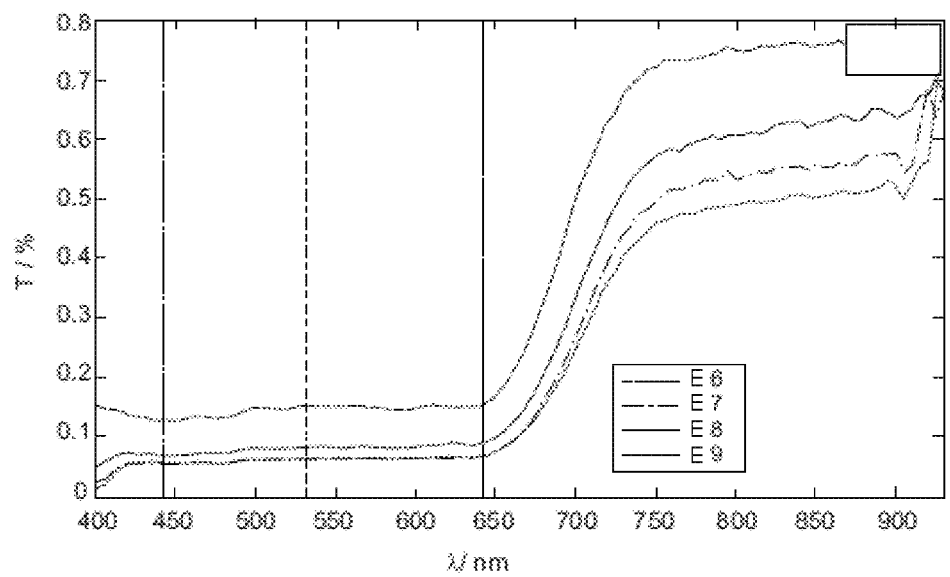
FIG. 7 shows the results of the transmittance measurements for Examples 6 to 9.

FIG. 7 shows the results of the transmittance measurements for Examples 6 to 9 in the wavelength range covering the range from the blue laser to the red laser. Example 6 and Example 7 here exhibit the lowest transmittance values of about 5-6% and 6-7% respectively, whereas with decreasing white-particle density the transmittance values in Example 8 rise as far as 8% and indeed in Example 9 transmittance values around 15% are reached.

Figure 8:
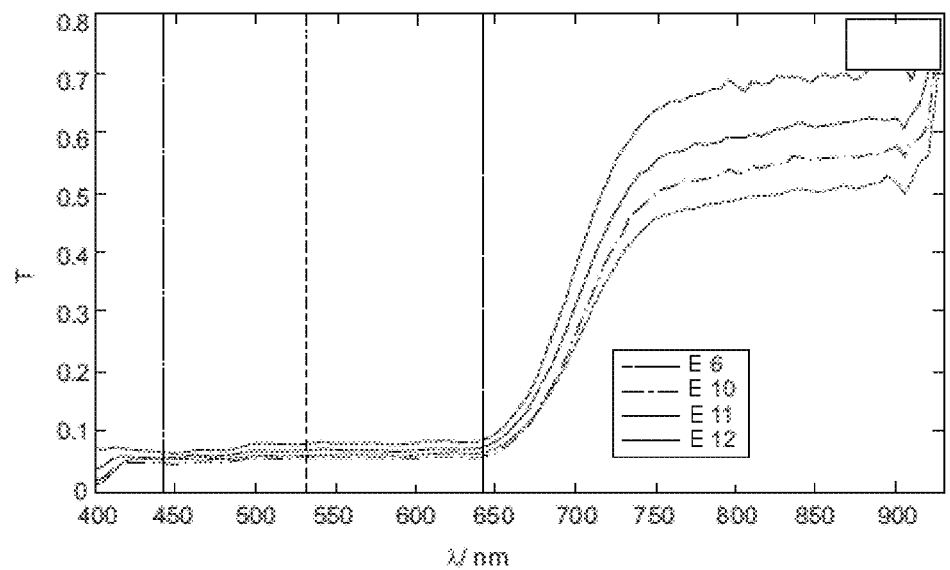
FIG. 8 shows the results of the transmittance measurements for Examples 6 and 10 to 12.

FIG. 8 shows the results of the transmittance measurements for Examples 6 and 10 to 12 in the wavelength range described for FIG. 8. Lower dependency of transmittance on film thickness is observed here, and the transmittance values rise from about 5% to value of about 8% with decreasing thickness.

The invention claimed is:

1. A plastics film comprising at least two layers, comprising
   at least one grey layer comprising at least one thermoplastic and having transmittance of from 10 to 70% in the visible wavelength range and
   at least one further layer comprising at least one thermoplastic and scattering particles;
      wherein the at least one grey layer comprises at least one colour pigment or at least one dye and
      wherein across more than 50% of the film area, the transmittance of the at least one grey layer for light in the wavelength range from 450 to 600 nm differs by ±5% or less.

2. The plastics film according to claim 1, wherein the scattering particles can be organic and/or inorganic scattering particles.

3. The plastics film according to claim 1, wherein the plastics film has been subjected to a three-dimensional forming process.

4. The plastics film according to claim 1, wherein the surface roughness ($R_{3z}$) of an outwards-facing surface of the further layer comprising at least one thermoplastic and scattering particles is from 1 to 10 µm.

5. The plastics film according to claim 1, wherein the thermoplastic(s) in the layers mutually independently involve(s) polycarbonates or copolycarbonates based on diphenols, poly- or copolyacrylates, poly- or copolymethacrylates, poly- or copolymers with styrene, thermoplastic polyurethanes, polyolefins, poly- or copolycondensates of terephthalic acid or naphthalenedicarboxylic acid or a mixture of these.

6. The plastics film according to claim 1, wherein located on an outwards-facing side of the grey layer there is a further functional layer.

7. The plastics film according to claim 1, wherein the scattering particles involve inorganic scattering particles with a particle size of less than 1 µm.

8. The plastics film according to claim 7 in an automobile, aircraft rail-vehicle or watercraft interior sector or in one or more electrical devices.

9. The plastics film according to claim 7 in an automobile, aircraft rail-vehicle or watercraft interior sector or in one or more domestic electrical devices, or devices in consumer electronics.

10. The plastics film according to claim 1, wherein located between the grey layer and the further layer comprising the scattering particles there is at least one additional layer comprising at least one thermoplastic.

11. The plastics film according to claim 1 in a capable of in a rear-projection film.

12. The plastics film according to claim 1 in one or more in back-lit components.

13. A process for producing a plastics film according to claim 1 comprising coextrusion, lamination or extrusion-lamination.

14. The plastics film according to claim 1, wherein across more than 70% of the film area, the transmittance of the at least one grey layer for light in the wavelength range from 450 to 600 nm differs by ±5% or less.

15. The plastics film according to claim 1, wherein the thermoplastic(s) in the layers mutually independently involve(s) polycarbonates or copolycarbonates based on diphenols, poly- or copolyacrylates, poly- or copolymethacrylates, poly- or copolycondensates of terephthalic acid or naphthalenedicarboxylic acid or a mixture thereof.

16. The plastics film according to claim 1, wherein located on an outwards-facing side of the grey layer there is a further scratch-resistant coating, an antireflective coating or an antiglare coating or a coating with one or more thereof.

17. The plastics film according to claim 1 as a rear-projection film in black-panel applications.

18. The plastics film according to claim 1 in one or more in back-lit display elements, control elements and/or decorative elements.

* * * * *